Feb. 23, 1971   L. EIGENMANN   3,565,983
PROCESS FOR THE CONTINUOUS PRODUCTION OF TUBULAR TEXTILE
CONTAINERS INTENDED IN PARTICULAR FOR USE
IN LEAD-ACID STORAGE BATTERIES
Filed Oct. 25, 1967   7 Sheets-Sheet 1

INVENTOR

BY

ATTORNEY

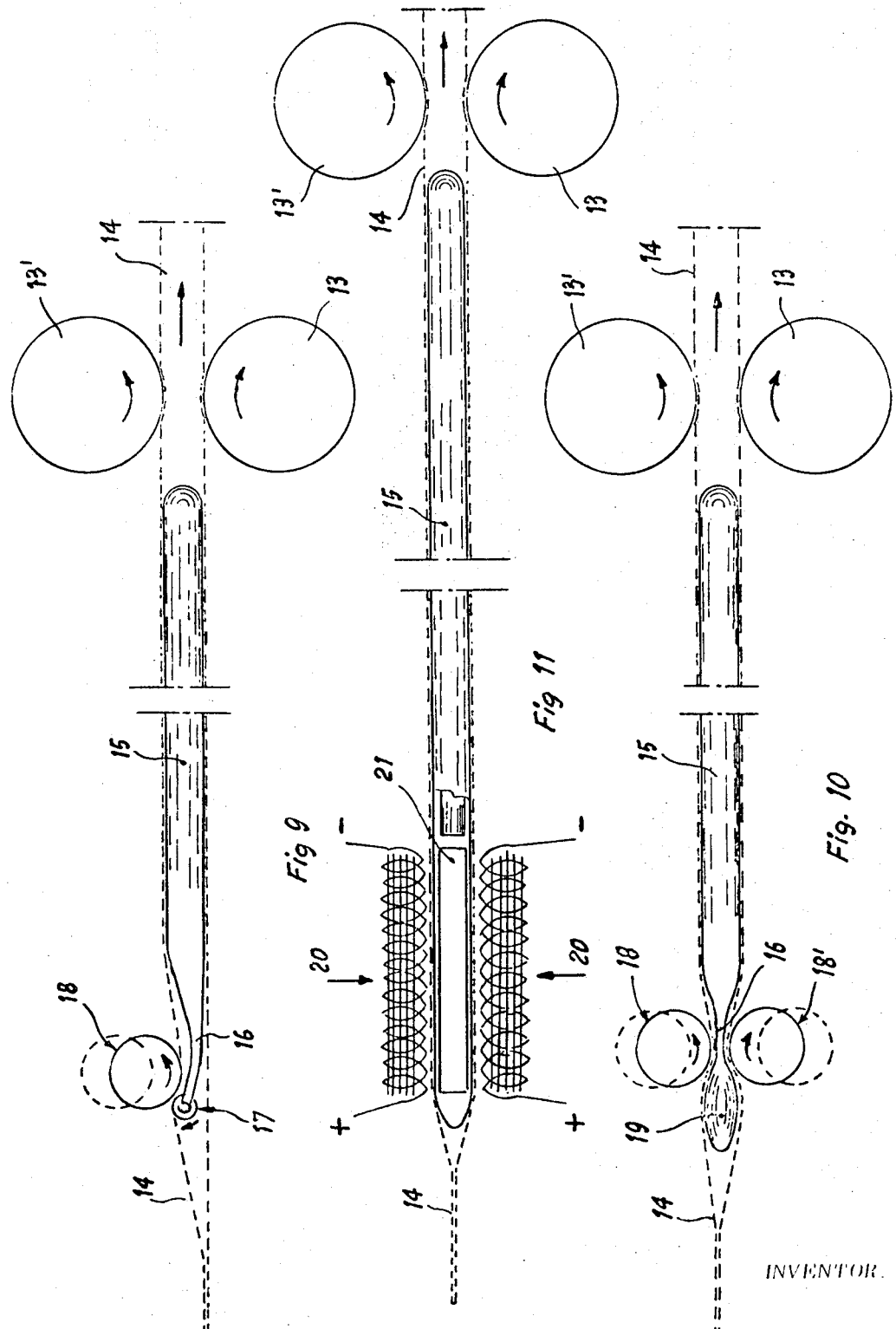

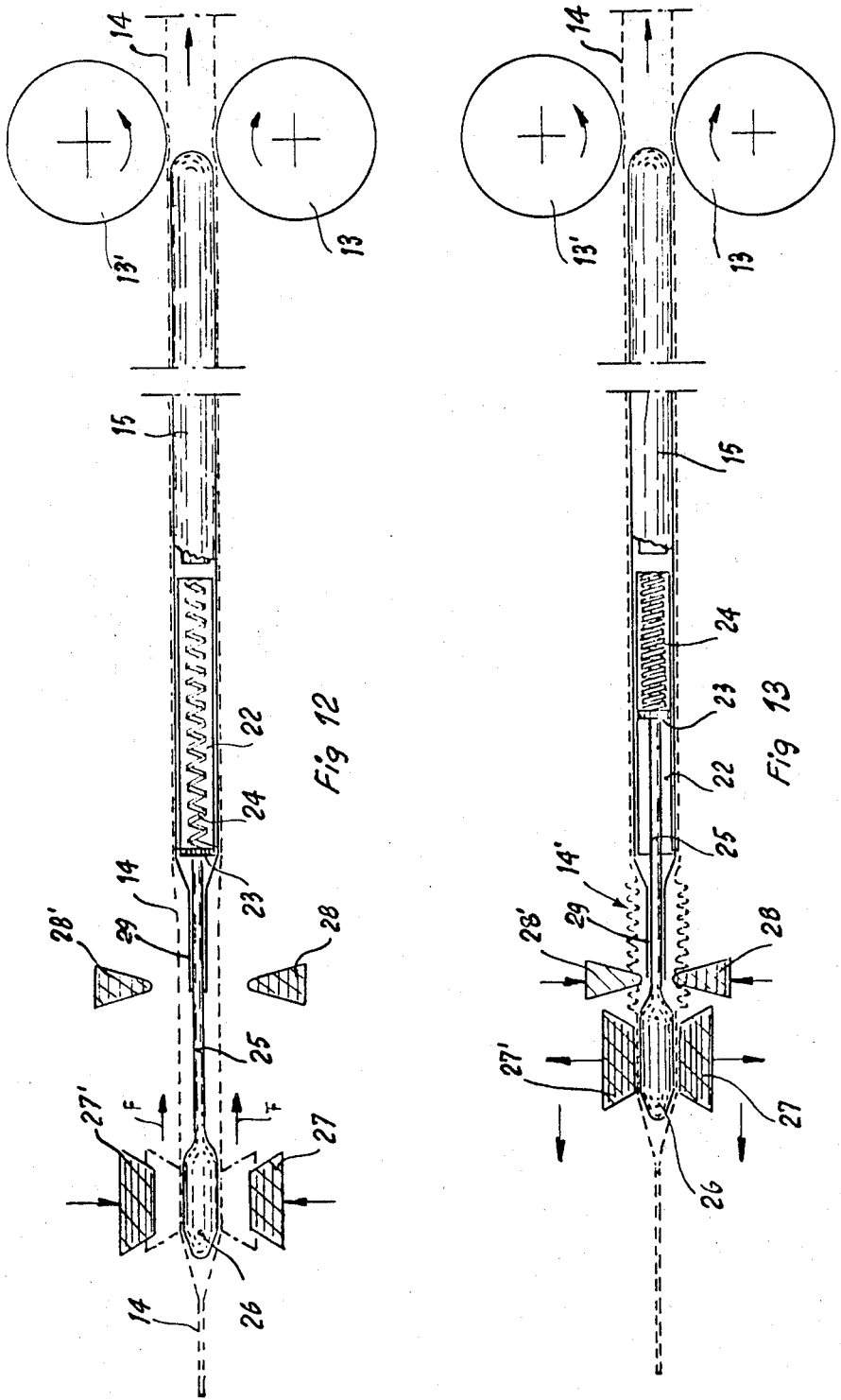

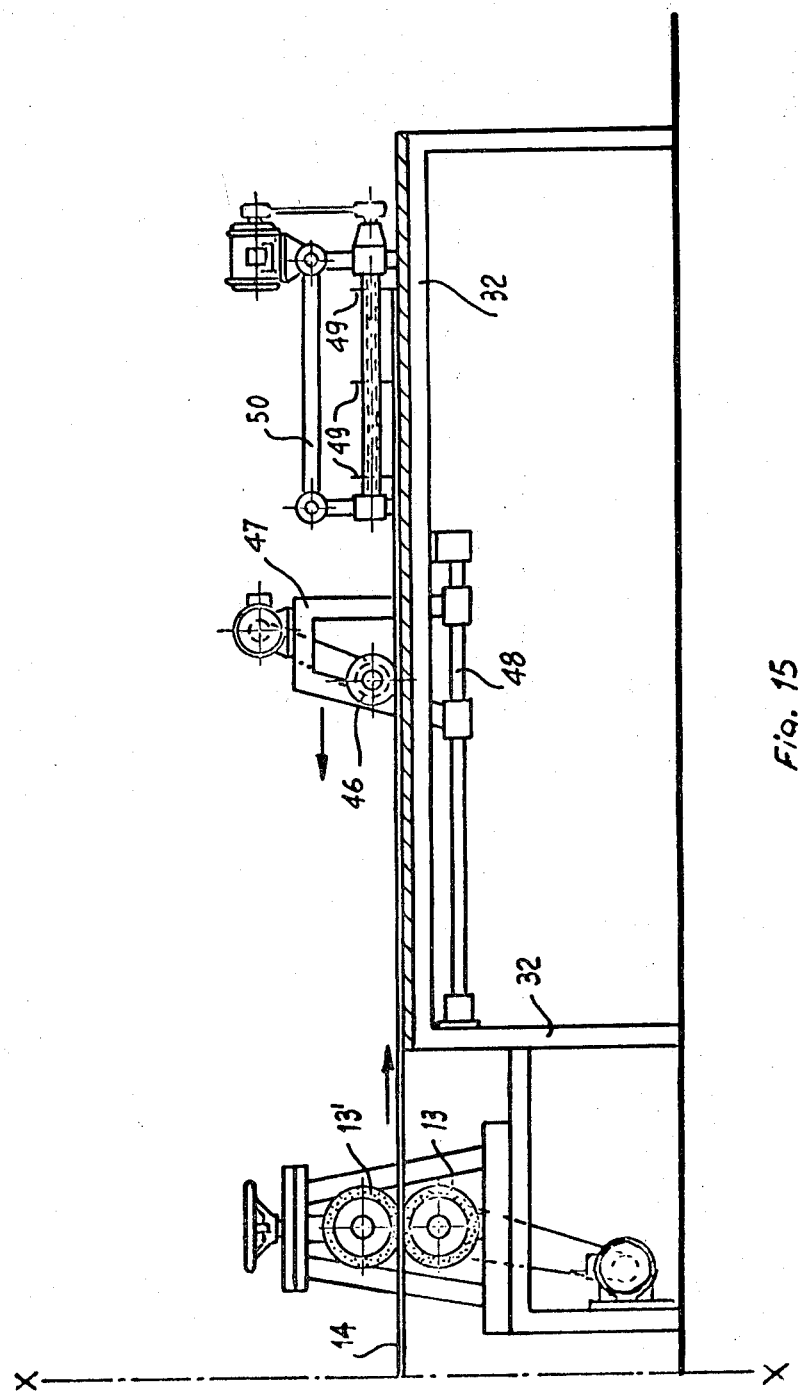

United States Patent Office 3,565,983
Patented Feb. 23, 1971

3,565,983
PROCESS FOR THE CONTINUOUS PRODUCTION OF TUBULAR TEXTILE CONTAINERS INTENDED IN PARTICULAR FOR USE IN LEAD-ACID STORAGE BATTERIES
Ludwig Eigenmann, Vacallo-Canton Ticino, Switzerland
Filed Oct. 25, 1967, Ser. No. 677,919
Int. Cl. B29d 23/00; B29g 5/00
U.S. Cl. 264—137                                     8 Claims

ABSTRACT OF THE DISCLOSURE

Method for continuously forming plastic impregnated fabric tubing for use in forming lead-acid storage batteries wherein two superposed layers of fabric joined at spaced apart lines is positioned on expandable shaping elements, then impregnated with a hardening material and then shaped by expansion of the shaping elements which are held in their expanded conditions until the hardening material sets. Thereafter the shaping elements are contracted and the resultant fabric is advanced relative to the shaping elements to dispose another portion of that fabric on the shaping elements; and thereafter the method is repeated with the apparatus necessary therefor.

---

The present invention relates to a process for the continuous production of tubular textile containers intended in particular for use in lead-acid storage batteries.

Such containers are generally made at present essentially from fabric produced from synthetic fibre or the like. So-called "alternating double" fabric, which has long been known, lends itself particularly well to this manufacturing process, this fabric comprising a pair of superposed plies joined together only along a series of uniformly spaced parallel lines to form a series of adjacent tubular compartments.

At the present time, this alternating double fabric is converted into rigid containers for electric batteries by shaping the individual compartments of the fabric and producing with known means a stiffening of the said fabric such as to cause it to retain the shape imparted to it.

Heretofore, the property which some textile fibres have of shrinking if subjected to heating, sticking together at least partially and consequently hardening has been utilized to produce this stiffening. This hardening is produced on rigid cores which are introduced into the tubular compartments of the fabric to bring and keep it in shape.

Due to the sticking together of the individual fibres, there is obtained in the fabric in contact with the metal core a stiffening the value of which is all the higher the more thoroughly the thermal treatment of the fabric in question, and the consequent shrinkage, are carried out.

This technique, however, has two considerable drawbacks. First of all, in order to obtain the shrinkage of the fabric on the metal core, the thermal treatment of the fibre is carried as far as the softening temperature, which spoils the mechanical strength properties of the fibre itself to a greater or lesser degree. The resistance of the fibre to chemical agents and its porosity are also affected by the unavoidable decomposition caused by the heating.

Moreover, in the present technique and again because of the behaviour of the fibre on heating, it is not possible to avoid the inner surface of the textile tube sticking to a more or less marked degree to the outer surface of the core. This sticking then makes the withdrawal of the cores inserted into the tubular compartments of the fabric for the purpose of each shaping or forming operation a hazardous and difficult process. Attempts have been made to obviate the first of these drawbacks by reducing the time during which the fabric remains at the shrinking temperature; however, though this achieves the result of not jeopardizing the mechanical strength of the fibres too much, the sticking of the fabric to the core to a more or less marked degree is nevertheless not successfully prevented.

Because of this sticking and the difficulty of the operation of withdrawal of the cores, the process is of necessity intermittent.

Finally, it is pointed out that this technique enables only a very limited number of fabrics to be used; to be precise only those made of fibres which, when brought to the softening temperature, are subject to actual shrinkage.

Methods of stiffening without shrinkage have long been known, however, these methods are based on the impregnation of the fibres with liquids which, by evaporation or polymerization, cause hardening of the said fibres. But these methods have not found practical application because of the difficulty of giving an exact shape to the tubular compartments of the fabric in the absence of the shrinkage of the said fabric on the cores.

All these disadvantages are eliminated by the process which is the object of the present invention, which makes it possible to effect the continuous production of tubular textile containers at a high rate of output, with the possibility of complete automation and the consequent minimum use of labour and a consistent quality of the manufactured article.

The process according to the invention utilizes substantially fabrics of the type having adjacent, parallel tubular compartments and is characterised in that the said fabric, having tubular compartments disposed with their axes parallel to the warp threads and each containing an expandable shaping element, is caused to advance, at least partly in a continuous manner, to be subjected to an at least superficial application of hardening fluid, is brought into shape by expansion of the shaping elements and is subjected to drying, to harden the said fluid, with the shaping elements expanded, the said shaping elements being housed in the tubular compartments of the fabric in a substantially fixed manner with respect to the advancing fabric.

Preferably, the fabric is caused to advance by a first step while the shaping elements are contracted, the said elements are then expanded until they are brought into close contact with the inner walls of the fabric, which thus comes to assume the final form made up of tubular elements, the fabric is then subjected to stiffening treatment by applying the said hardening liquid and subsequent drying, the said shaping elements are then contracted and, finally, the fabric is slipped along by one step with respect to the shaping elements until it is caused to assume a position in which a following length of the said fabric is disposed on the said elements to be subjected to stiffening in its turn, and so on.

In the process according to the invention, the tub fabric therefore does not shrink on a preformed rigid core, but in fact a deformable shaping element which is substantially of small dimensions expands against the inner surface of the tube fabric, bringing it correctly into shape. The stiffening of the fabric is obtained by complete or only superficial impregnation of the said fabric with liquids based, for example, on synthetic resins and which, by evaporation of the solvent or by polymerization, tend to harden into a solid substance.

Tube fabrics employing twisted fibre are very suitable for carrying the method in question into practice; the technique of twisting fibres, which is very well known in the textile field, enables the fabric to be given the desired characteristics easily. The absence of any shrinking effect provides the possibility of utilizing the properties of maximum porosity of the fabric and operating with constant characteristics.

The fabrics must also be endowed with good mechanical characteristics; to this end, it is possible to make use of any type of fibre, inasmuch as the property of shrinking through heating, a property possessed only by some synthetic fibres, is no longer required.

As the stiffening is obtained by treating the fibre with an applied hardening substance, when the impregnation with such a substance is complete not even a very high resistance of the fibre to acids is necessary, it being possible to entrust this resistance to the same substance which is used for stiffening; in fact, the more the hardening substance is resistant to acids, and provided it is present at least in a continuous and sufficiently impermeable film, the less the fibre must necessarily be endowed with chemical resistance. In practice, good results are obtained by preferably employing fibres which are somewhat resistant to acids, in the presence of stiffening substances having a medium resistance. By way of example, it is possible to use acrylic fibres, stabilized polypropylene fibres, and also fluorinated and chlorinated fibres and the like. As liquids adapted to effect stiffening of the tube fabric there are generally employed liquids which tend to harden or solidify even at relatively low temperatures; for example, it is possible to use solutions of polymers, such as thermoplastic substances or elastomers which harden by evaporation of the solvent, preferably substances with a low percentage of plasticizer or absolutely without plasticizer, such as polymers of polyvinyl chlorides, vinylidene polychlorides, vinylidene polyfluorides, polychlorotrifluoroethylenes, polytetrafluoroethylenes, rigid vinyl copolymers and the like. It is also possible to use liquid monomers which solidify by polymerization, such as epoxide resins, polyesters resins, allylalkyl resins and the like, or, finally, combinations of the above-mentioned substances.

The invention will however be better described with reference to the accompanying drawings, which show diagrammatically and by way of example an installation and parts thereof which enable the process according to the invention to be carried into effect. In the drawings:

FIGS. 9 and 10 show diagrammatically examples of the application of the shaping elements of the invention in an apparatus for continuous supply of the fabric which is equipped with mechanical means for holding the said shaping elements in a fixed position;

FIG. 11 shows an arrangement similar to FIGS. 9 and 10 in which the shaping elements are controlled by means of an electromagnetic device;

FIGS. 12 and 13 illustrate diagrammatically another example of the application of the shaping elements of the invention, with means for forming a store or reserve of fabric, the arrangement being shown in two successive working stages;

Figure 14:
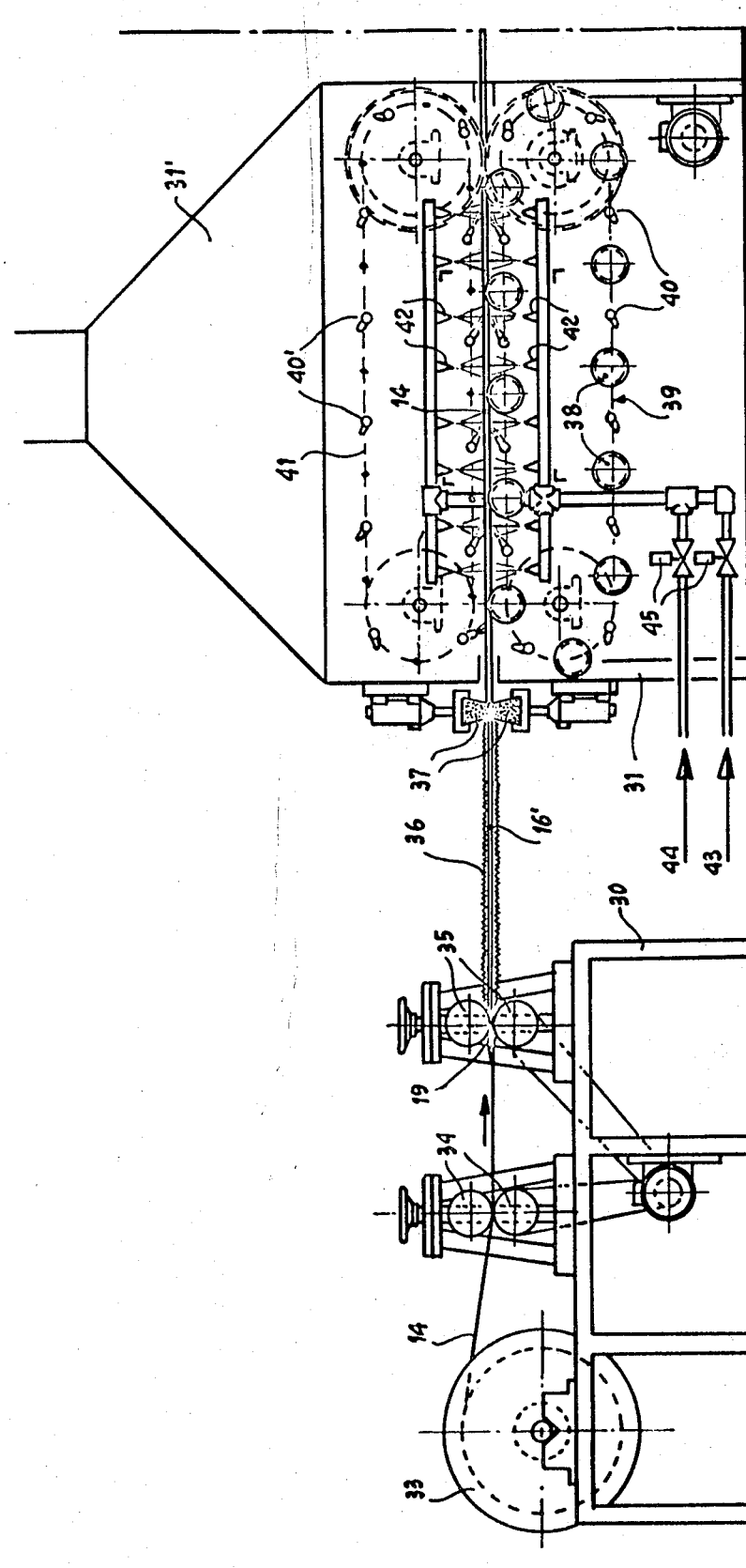

FIGS. 14 and 15, which are considered to be joined along the lines X—X, show diagrammatically a complete installation for the treatment of the fabric.

In the known technique, use is generally made of a fabric constituted by two superposed plies 1 and 2 joined together along uniformly spaced parallel connecting or joining lines 3 forming a series of tubular compartments 4 of constant dimensions. The axes of the tubular compartments 4 are disposed parallel to the weft threads and the compartments themselves are open at both ends. According to the known technique, rigid cores 5 of dimensions smaller than those of the said compartments 4 are inserted into these compartments 4. The fabric is then heated and, due to its nature, tends to shrink and adhere to the core 5. After the fabric has been cooled, the cores 5 are withdrawn from the tubular compartments 4, which then retain the shape given to them by the said cores 5, due to the above-mentioned effect of sticking together of the fibres of the fabric sticking together. As has been said, the operation of withdrawal of the cores 5 is difficult, because of the partial sticking of the fibres to the cores, and hazardous, owing to the relative fragility of the fibres after the heating treatment, and therefore necessarily intermittent.

Figure 1:
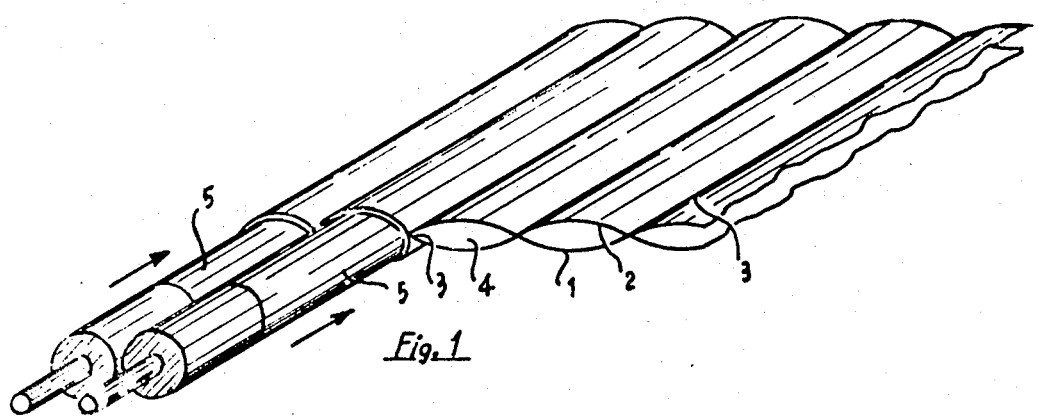
FIGS. 1 and 2 are diagrammatic perspective views of a length of tubular or tube fabric brought into shape by the known technique.
Figure 2:
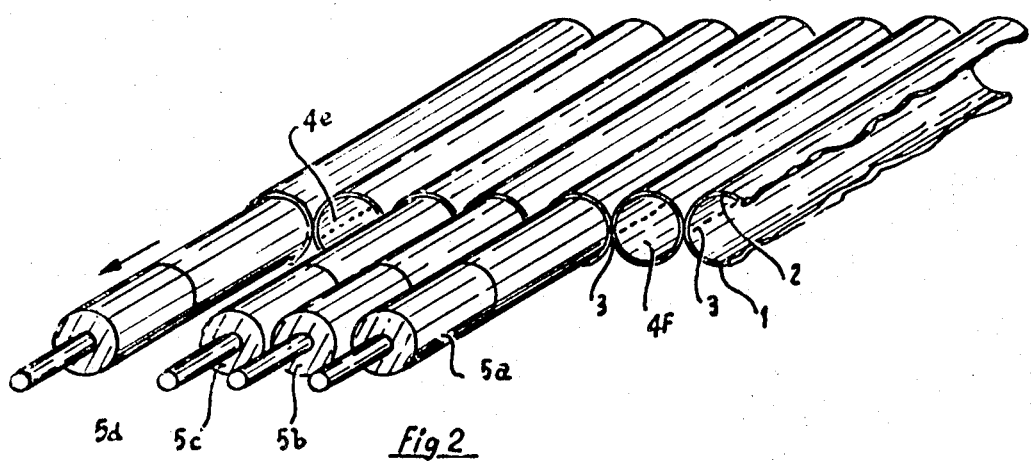
Figure 3:
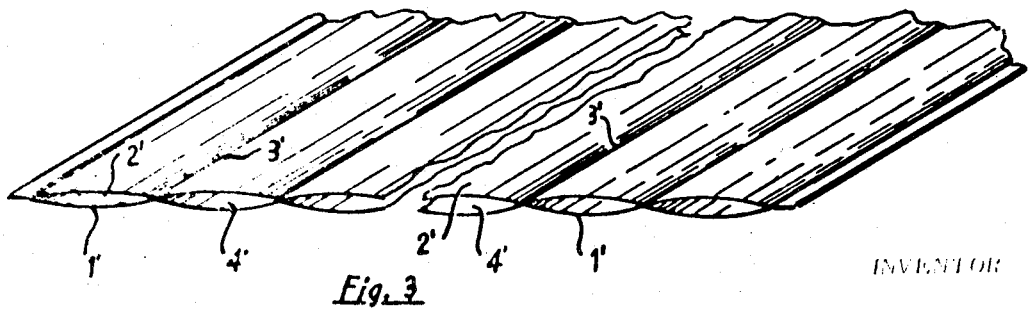
FIG. 3 is a perspective view of a length of alternating double fabric suitable for the production of containers according to the present invention.

According to the present invention, as has been said, these drawbacks and difficulties are eliminated and a completely continuous and, if necessary, automatic process is moreover achieved. This process is based principally on the use of deformable shaping elements, such as are illustrated, for example, in FIGS. 4 to 8, and of a tube fabric with compartments 4' having axes parallel to the warp threads; in a fabric of this type, the joining lines 3' divide the width of the fabric between the two salvages into an integral number of tubular compartments 4' of constant dimensions (see FIG. 3).

Figure 4:
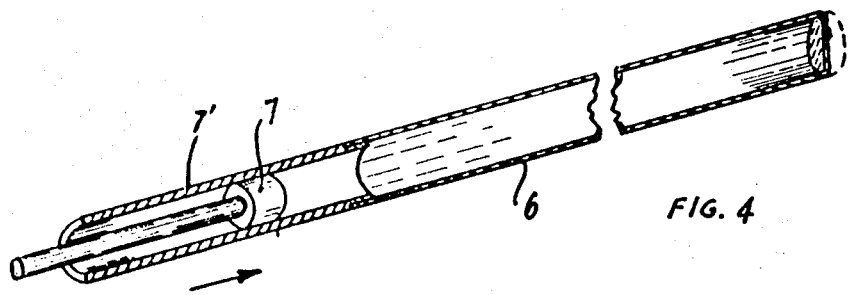
FIGS. 4 to 6 show diagrammatically a number of embodiments of expanding shaping elements according to the invention of types in whcih expansion is produced by an increase in the pressure of a fluid.
Figure 5:
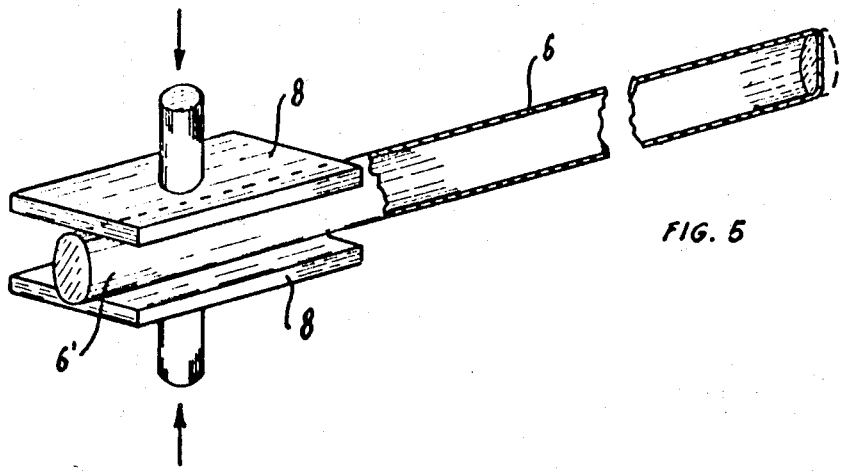
Figure 6:
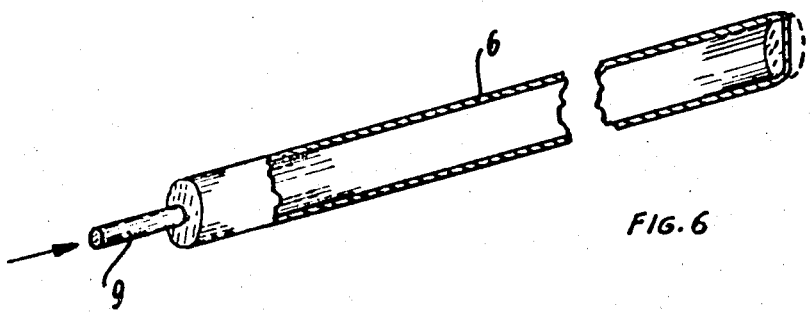

In FIGS. 4 to 6, the shaping elements are constituted by tubular elements 6 made of material which is sufficiently elastic to permit a uniform expansion when an increase in pressure, for example of a gaseous or liquid fluid, is produced inside them.

In the constructional form of FIG. 4, the increase in the pressure of the fluid is obtained, for example, by actuation of a piston 7 slidable in a rigid initial portion 7' of the tubular element.

In the constructional form of FIG. 5, the increase in the pressure is obtained by squashing one end 6' of the tubular element by means of compression plates 8.

Finally, in the constructional form of FIG. 6, the increase in the pressure is obtained by introducing fluid under pressure through an end conduit of the tubular element 6; this fluid may come, for example, from a bulb associated with the conduit 9 and containing a liquid at the boil.

According to a preferred constructional form, a certain amount of liquid with a sufficiently low boiling point may be contained directly in the shaping element itself; in this case, the expansion and contraction of the shaping element are determined exclusively by the increase or the decrease in the temperature of the same, as a result of which the liquid boils or condenses, respectively. The choice of the liquid forms part of ordinary technology: the chemical category of the liquid (aliphatic or aromatic hydrocarbon, alcohol, ester and the like) depends on the type of deformable material used to make the shaping element 6; rubbers which are highly resistant to chemical reagents have been found best to use, for example the type known by the trademark "Vyton" (Dupont). On the other hand, the particular kind of liquid, in a given chemical category, is chosen according to its boiling point, which should best be a little lower than the temperature at which the fabric is treated.

Figure 7:
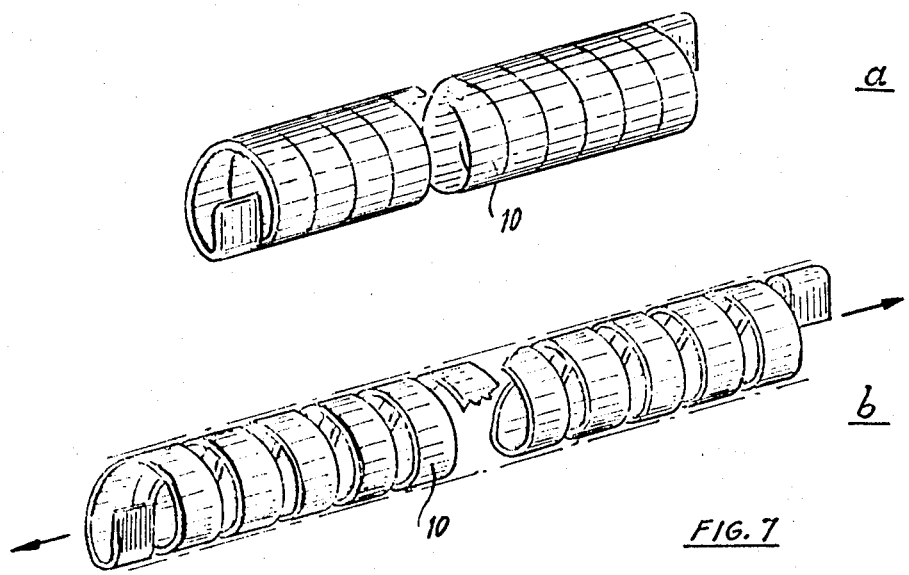
FIGS. 7 and 8 show diagrammatically other embodiments of expanding shaping elements according to the invention of types in which expansion is produced mechanically.
Figure 8:
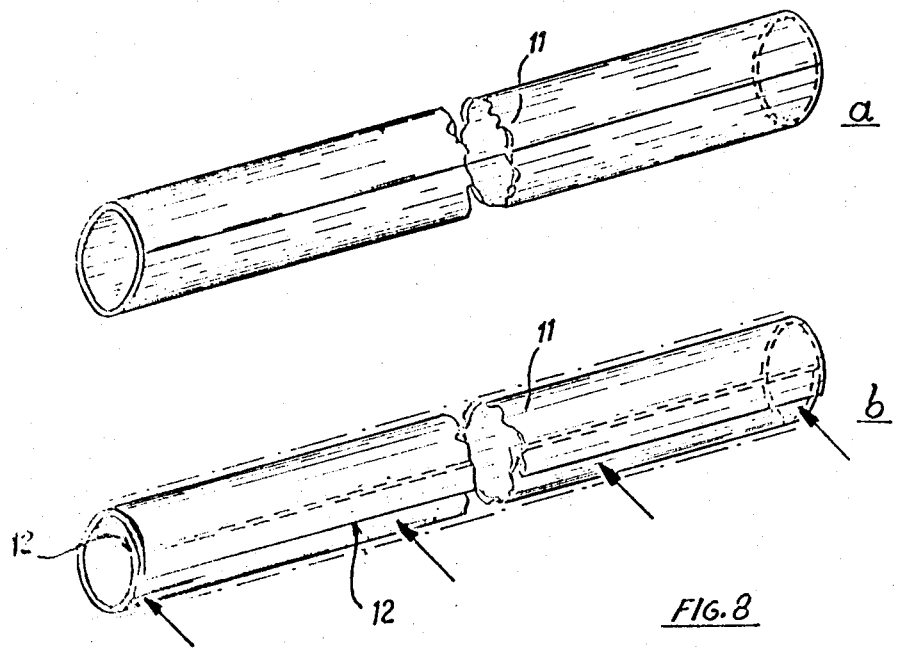

FIGS. 7 and 8, on the other hand, show shaping elements of the type in which the expansion is obtained mechanically, for example by shifting and/or deformation of flexible strips.

FIG. 7 shows a shaping element constituted by a spiral 10 made of flexible metal strip, the cross-section of which is contracted by exerting axial pulls in opposite directions at the two ends of the said spiral (see FIG. 7b). Subsequent release of the spiral, in addition to causing the coils to move up to one another, automatically produces the widening thereof (see FIG. 7a), or expansion of the shaping element.

In FIG. 8, the shaping element is made in the form of a tube 11 cut parallel to its axis. The tube is contracted by making one of the edges 12 overlap the other or producing a certain rolling or curling up of the said tube (see FIG. 8b). Subsequent release automatically brings the tube into the extended position, the position of expansion (see FIG. 8a).

FIGS. 9 to 13 show diagrammatically the underlying principle of an installation for the continuous treatment of the tube fabric which employs shaping elements of the types illustrated in FIGS. 4 to 8. As shown in the individual drawings, a pair of rolls 13, 13' which are disposed on opposite sides of the fabric 11 produces the advance thereof. The surface of the rolls is made of particularly resilient and soft material and preferably has a profile complementary to the half-section of the shaped fabric.

Housed in the individual tubular compartments of the fabric are shaping elements 15 to which the task of bringing the said compartments into shape in known manner is entrusted.

According to the variant of FIG. 9, at its end remote from the rolls 13, 13' each shaping element 15 is extended in an arm or rod 16 carrying a stop roller 17 at its end. This roller has the function of keeping the shaping element 15 still with respect to the advancing fabric 14 and, to this end, the roller co-operates with blocking or arresting means constituted, for example, by a roll 18 mounted loosely on a fixed shaft on the outside of the fabric 14.

During the processing, the fabric, or at least the upper portion thereof (as shown in the drawing), slides between the rollers 17 and 18, while the shaping element 15 is retained in a fixed position by the roller 17 bearing against the surface of the roll 18.

According to the variant of FIG. 10, the roller 17 is replaced by an ovoid bulb 19 over which the fabric can slide, while a second roll 18' co-operates with the roll 18 at the opposite face of the fabric 14. In both cases the fabric is made to advance by steps, each time to an extent substantially corresponding to the length of the shaping element 15, and is then subjected to the stiffening treatment during the stage when the fabric is stationary and the shaping element is expanded.

According to the variant of FIG. 11, the means for arresting the shaping element 15 are constituted by an electromagnet 20 which acts on a body 21 of ferromagnetic material associated with one end of the said shaping element 15. The function of the electromagnet 20 is identical to that of the roller 17, provided it is kept constantly in operation. With this arrangement, however, it is also possible to impart a continuous uniform movement to the fabric. The shaping element 15 will then be able to follow the movement of the fabric for a certain distance during the stiffening stage and be subsequently "returned" by the electromagnet to dispose itself in correspondence with a following length of fabric which is to be stiffened. In this way, the intermittent movement is performed by the shaping element rather than by the fabric.

This method employing electromagnetic control has another advantage with respect to the methods illustrated in FIGS. 9 and 10, and this is that the wear, which is moreover relatively slight, that occurs during the sliding of the fabric between the stop 17, or 19, and the rolls 18–18' is completely avoided.

According to the varient of FIGS. 12 and 13, the shaping element 15 has at its end remote from the rolls 13, 13' a chamber 22 in which a piston 23 slides under the action of a spring 24. Associated with the piston 23 is a rod 25 and that end of the latter which is outside the chamber 22 carries an ovoid bulb 26. Two pads 27, 27' are mounted on opposite sides of the fabric and designed to co-operate with the bulb 26; it is possible to impress on the pads 27, 27' a movement normal to the fabric in opposite directions at the same time, as well as a simultaneous movement parallel to the said fabric.

A second pair of pads 28, 28' co-operates with the tapered end or neck 29 of the shaping element 15.

According to this modified constructional form, the following procedure is adopted: in the position shown in FIG. 12, the pads 27, 27' are brought against the bulb 26, clamping the fabric 14 against the latter; they are then made to advance in the direction of the arrows F, keeping them clamped on the bulb 26 so as to move the latter and compress the spring 24 through the rod 25 and the piston 23, in order to cause the fabric to advance and thus form a kind of "store" or reserve 14' concentrated on the neck 29. The pair of pads 28, 28' then intervenes to clamp the said "store" 14' on the neck 29, while the pads 27, 27' are moved away and brought back to the initial position and the bulb 26, which is now free, is pushed back again by the spring 24. The store 14' is thus ready to be made to slip over the shaping element 15 as soon as the stage of stiffening the preceding length of fabric has been completed. This mechanical method employing a store, which is designed to facilitate the advance of the fabric over the shaping element, therefore operates with separate movements, those of formation of the store and those of shifting the shaped tubular fabric forward.

Finally, FIGS. 14 and 15 illustrate an example of a complete installation, though this is shown very diagrammetically, which lends itself to being used industrially for the application of the process according to the invention. This installation essentially comprises a feed bench 30, a treatment chamber 31 and a bench 32 for exit and cutting to size. Mounted on the bench 30 so as to be freely rotatable thereon is a drum 33 on which the tube fabric is wound in a piece; the fabric is caused to advance at a low speed by guide rolls 34 and feed rolls 35. The arrangement adopted here is similar to that of FIG. 10: the rolls 35 correspond to the rolls 18, 18' and serve to retain the shaping elements through the medium of the relative bulb-shaped ends 19. According to this application, however, the shaping elements are not directly anchored to the bulb-shaped ends 19, but between them there are interposed long rigid rods 16' which cover the distance between the rols 35 and the chamber 31. Due to the continuous, uniform movement of the feed rolls 35, there is formed on these rods a store or reserve 36 of fabric which ensures that the material required to replace a length of fabric which has already undergone the stiffening treatment will be available. This store is formed against a pair of pads 37 which clamp the fabric on the rod 16' immediately in front of the chamber 31; these pads are opened at the moment when the fabric is moved towards the chamber 31.

The fabric 14 then extends throughout the chamber 31 and the above-mentioned shaping elements are housed in its tubular compartments practically over the entire length of the chamber 31. In the chamber 31, the fabric 14 is supported by a series of pivoted and freely rotatable bearing rollers 38 on an endless moving chain 39. On leaving the chamber 31, the fabric, which has already been treated and hardened, is supported and caused to advance by the pair of draw rolls 13 and 13' (see also FIGS. 9 to 13).

Inside the chamber 31 there is provided a large number of nozzles 40 by means of which the spraying of the hardening fluid on to the surface of the fabric 14 is effected; these nozzles are movable, since the length of fabric which undergoes the treatment in the chamber 31 is kept stationary. A first series of nozzles 40 is preferably mounted on the same chain 39 that carries the rollers 38; these nozzles spray the fabric on its lower face. A second series of nozzles 40', on the other hand, is mounted on a second chain 41 positioned above the fabric and symmetrically with respect to the chain 39; the two chains are controlled in synchronism by a single driving motor.

The nozzles 40 and 40' are mounted in such manner with respect to the relative supporting chains that the sprays are directed substantially tangentially to the fabric. This arrangement enables the sprayed liquid to be deposited only superficially on the fabric, without penetrating into it, thereby preserving the optimum characteristics of porosity of the inner surface of the said fabric and moreover avoiding the inserted shaping element sticking to the surface. In the chamber 31 there is moreover disposed a double series of air injectors 42 which can be supplied alternately with cold air and hot air through two separate pipes 43 and 44 controlled by a double valve 45.

A suction hood 31' closes the chamber 31 at the top for the purpose of removing the vapours.

The installation described operates in the following manner: while the draw rolls 13, 13' for the fabric are stationary at the beginning of a treatment stage, a jet of hot air is sent towards the fabric by the injectors 42 and causes the expansion of the shaping elements housed inside the fabric; in this case, in fact, the shaping elements are of the rubber type containing a liquid with a low boiling point and the jet of hot air is sufficient to produce intense evaporation of this liquid. When the expansion has taken place, the chains 39 and 41 are set in motion; the bearing rollers 38, which have a grooved surface, support the shaping elements housed inside the tubular compartments of the fabric and ensure perfect alignment and spacing thereof. The nozzles 40 anchored to the chain 39 and movable therewith, and which are disposed between the rollers 38 with an orientation substantially tangential to the tubular elements, spray the lower surface of the fabric with hardening liquid; similarly, the nozzles 40' carried by the chain 41 effect the spraying of the upper surface of the fabric. In the meantime, the jets of hot air from the injectors 42 continue, both in order to maintain the boiling temperature of the liquid in the shaping elements and in order to promote the hardening of the stiffening liquid sprayed by the nozzles 40, 40', for example by evaporation of the solvent. The necessary stiffening having been obtained, the spray from the nozzles 40, 40' is interrupted and, instead of hot air, the injectors emit cold air; this causes the condensation of the liquid contained in the shaping elements and, consequently, the contraction thereof.

The shaped tube fabric is now no longer clamped on the shaping elements, the pads 37 are opened and the draw rolls 13, 13' cause the stiffened fabric to advance rapidly towards the exit bench and draw fresh fabric which has not yet been treated on to the shaping elements; this fresh fabric comes from the store 36, which is at least partly depleted and is freshly made up during the subsequent stiffening stage due to the slow but continuous movement of advance produced by the feed rolls 35.

Provided on the exit bench 32 is an assembly of cutting devices of a type substantially known per se and comprising, for example, a first series of rotating cutters 46 mounted on a carriage 47 movable longitudinally on the guide 48, as well as a second series of rotating cutters 49 mounted on a carriage 50 which is movable transversely. The set of cutters 46 and 48 enables the cutting to size of the shaped tube fabric to be effected without special expedients having to be employed for this purpose; in fact, while the fabric formed into containers is sufficiently rigid, it retains a measure of elasticity sufficient for it to resume its shape even after the flattening due to the cutting process.

A number of examples of application of the process according to the present invention will illustrate better the object of the said invention, without thereby limiting the scope thereof.

EXAMPLE 1

A tube fabric made of polypropylene fibre stabilized against oxidation, known commercially by the name "Hercules," is impregnated with an epoxide solution consisting of 10 parts of Araldite 820 A resin (Ciba) dissolved in 85 parts of methyl ethyl ketone, the whole being treated with 5 parts of Araldite 820 B resin (Ciba); the impregnation is controlled in such manner that about 10% of dry substance remains on the textile fibre.

Disposed in this fabric along axes which are characteristically parallel to the warp threads are shaping elements with respect to which the fabric is caused to slide; the expansion of the shaping elements is effected before or after the impregnation.

The evaporation of the solvent and the polymerization of the resin take place at room temperature while the shaping elements are expanded.

EXAMPLE 2

A tube fabric made of "Hercules" polypropylene fibre stabilized against oxidation is impregnated or treated by spraying with a solution of rigid vinyl copolymer VIPLA TJT (Montecatini), 1% thereof being dissolved in methyl ethyl ketone; the impregnation is effected in such manner that about 12% of dry substance remains on the textile fibre.

Disposed in this fabric along axes which are characteristically parallel to the warp threads are shaping elements with respect to which the fabric is caused to slide; the expansion of the shaping elements is effected before or after the impregnation or the spray treatment. The evaporation of the solvent is effected in a stream of hot air at 60° C. while the shaping elements are expanded.

EXAMPLE 3

A tube fabric made of acrylic fibre (Chemstrand Corporation) is impregnated or treated by spraying with a solution of 5 parts of Dow polyvinylidene chloride in a solvent composed of 45 parts of butyl chloride and 50 parts of methyl chloride; the impregnation is effected in such manner that about 12% of dry substance remains on the textile fibre.

Disposed in this fabric along axes which are characteristically parallel to the warp threads are shaping elements with respect to which the fabric is caused to slide; the expansion of the shaping elements is effected before or after the impregnation or the spray treatment. The solvent is allowed to evaporate in a stream of air at 60° C. while the shaping elements are expanded.

EXAMPLE 4

A tube fabric made of fluorinated fibre (DuPont Teflon) is impregnated or treated by spraying with a solution of 30 parts of Acriplex 46 (Röhm & Haas—50% product) in ethyl alcohol; the impregnation is effected in such manner that about 9% of dry substance remains on the fibre.

Disposed in this fabric along axes which are characteristically parallel to the warp threads are shaping elements with respect to which the fabric is caused to slide; the expansion of the shaping elements is effected before or after the impregnation or the spray treatment. The evaporation of the solvent takes place in a stream of air at 80° C. while the shaping elements are expanded.

EXAMPLE 5

A tube fabric made of Acrilan acrylic fibre (Chemstrand Corporation) is impregnated or treated by spraying with a solution of one part of Sicron 540 resin (Sicedison) in a solvent composed of 39 parts of methyl ethyl ketone, 50 parts of acetone and 10 parts of ethylene dichloride; the impregnation is effected in such manner that about 11% of dry substance remains on the fibre.

Disposed in this fabric along axes which are characteristically parallel to the warp threads are shaping elements with respect to which the fabric is caused to slide; the expansion of the shaping elements is effected before or after the impregnation or the spray treatment.

The solvent is allowed to evaporate in a stream of air at 35° C. while the shaping elements are expanded.

Although the process has been described with particular reference to FIGS. 14 and 15, it is understood that these drawings only represent one particular application which is given purely by way of example and is in no way restrictive. There may be many modifications, also as regards the type of shaping element employed, without thereby departing from the scope of the invention.

For example, it is possible to immerse the fabric in a stiffening liquid, then place it on the shaping elements, produce the expansion of the latter and, finally, subject the fabric to drying. The disengagement of the shaping elements is facilitated if, during the stiffening operation, they are subjected to vibrating movements, which are also best of a rotary type. The treatment temperature is kept lower in every case than the shrinking temperature of the fibre if a fibre which is able to contract on softening is used. When the fabric is treated with stiffening substance sprayed on after the shaping elements have been expanded, it is possible to keep the stiffening substance concentrated essentially on the outer surface of the tube fabric, so as to preserve, on the inner face of the tube fabric, the inherent porosity of the fibre, which, in contact with the active battery material, offers advantages which are not insignificant in the electrochemical process.

Inasmuch as the examples and the ideas set forth have been described solely by way of indication and not by way of limitation, it is understood that many modifications may be made in what has been described, according to the development of the relevant technique, while still of course remaining within the scope of the invention.

I claim:

1. A method for producing tubular textile containers for use in lead-acid storage batteries comprising the steps of:
   (a) joining two superposed layers of fabric joined together along parallel spaced apart lines running parallel to the warp threads for defining longitudinally extending side-by-side tubular compartments therebetween;
   (b) disposing said compartments about a plurality of expendable shaping elements in their contracted conditions;
   (c) applying hardening fluid to the portion of said fabric disposed about said shaping elements;
   (d) expanding said shaping elements to thereby shape said portion of said fabric;
   (e) holding said shaping elements in said expanded condition until said hardening fluid hardens;
   (f) then collapsing said expandable shaping elements;
   (g) advancing said portion to thereby remove it from about said shaping elements and to dispose a different portion thereabout; and
   (h) progressively repeating steps (c) through (g).

2. The method of claim 1, wherein each time said fabric is advanced it is advanced about the length of said shaping elements.

3. The method of claim 1, wherein said fabric is moved continuously during said process and said shaping members are moved together with said fabric during step (e) from an initial position to a second position, and said shaping elements are returned to said initial position after step (f).

4. The method of claim 1, wherein the step of applying the hardening fluid is performed after the step of expanding the shaping elements.

5. The method of claim 1, wherein the step of collapsing said shaping elements is performed prior to the step of removing said portion from about said shaping elements.

6. A method for producing tubular textile containers for use in lead-acid storage batteries comprising the steps of:
   (a) joining two superposed layers of fabric joined together along parallel spaced apart lines running parallel to the warp threads for defining longitudinally extending side-by-side tubular compartments therebetween;
   (b) disposing said compartments about a plurality of expanded shaping elements in their contracted conditions;
   (c) applying hardening fluid to said fabric;
   (d) expanding said shaping elements to thereby shape said portion of said fabric;
   (e) holding said shaping elements in said expanded condition until said hardening fluid hardens;
   (f) then collapsing said expandable shaping elements;
   (g) advancing said portion to thereby remove it from about said shaping elements and to dispose a different portion therebetween; and
   (h) progressively repeating steps (c) through (g).

7. The method of claim 6, wherein the step of applying the hardening fluid is performed prior to the step of disposing the compartments about the shaping elements.

8. The method of claim 6, wherein the step of applying the hardening fluid is performed after the step of disposing the compartments about the shaping elements.

References Cited

UNITED STATES PATENTS

| | | | |
|---|---|---|---|
| 2,324,645 | 7/1943 | Prehler | 264—137X |
| 2,972,000 | 2/1961 | Boriolo | 264—324X |
| 3,234,309 | 2/1966 | Graff | 264—137X |
| 3,258,384 | 6/1966 | Scott | 264—137X |
| 3,267,190 | 8/1966 | Malloy | 264—137 |
| 2,995,781 | 8/1961 | Sipler | 264—137 |
| 3,316,337 | 4/1967 | North | 264—314X |
| 3,431,158 | 3/1969 | Poulson | 264—137X |

ROBERT F. WHITE, Primary Examiner

R. R. KUCIA, Assistant Examiner

U.S. Cl. X.R.

264—314